United States Patent
Belharouak et al.

(10) Patent No.: US 12,068,472 B2
(45) Date of Patent: Aug. 20, 2024

(54) RELITHIATION PROCESS FOR DIRECT REGENERATION OF CATHODE MATERIALS FROM SPENT LITHIUM-ION BATTERIES

(71) Applicant: UT-Battelle, LLC, Oak Ridge, TN (US)

(72) Inventors: Ilias Belharouak, Oak Ridge, TN (US); Yaocai Bai, Oak Ridge, TN (US); Rachid Essehli, Oak Ridge, TN (US); Jianlin Li, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 322 days.

(21) Appl. No.: 17/363,272

(22) Filed: Jun. 30, 2021

(65) Prior Publication Data
US 2022/0328800 A1    Oct. 13, 2022

Related U.S. Application Data

(60) Provisional application No. 63/174,082, filed on Apr. 13, 2021.

(51) Int. Cl.
*H01M 10/54* (2006.01)
*H01M 4/04* (2006.01)
(Continued)

(52) U.S. Cl.
CPC ......... *H01M 4/049* (2013.01); *H01M 4/0471* (2013.01); *H01M 10/0525* (2013.01);
(Continued)

(58) Field of Classification Search
CPC .. H01M 10/54; H01M 10/0525; H01M 4/525; H01M 4/505; H01M 4/0471; H01M 4/131; H01M 4/1391
See application file for complete search history.

(56) References Cited

U.S. PATENT DOCUMENTS 5,882,811 A * 3/1999 Kawakami ............ C22B 7/005
429/49
9,825,341 B2   11/2017 Sloop
(Continued)

FOREIGN PATENT DOCUMENTS

WO     2020025970 A1    2/2020
WO     2020185958 A1    9/2020
WO  WO-2020185958 A1 *  9/2020   ........ H01M 10/0525

OTHER PUBLICATIONS

Notification of Transmittal of the International Search Report and the Written Opinion of the International Searching Authority issued in PCT/US2022/020675, mailed Aug. 1, 2022 (12 pages).
(Continued)

*Primary Examiner* — Imran Akram
(74) *Attorney, Agent, or Firm* — WARNER NORCROSS + JUDD LLP (57) ABSTRACT

A method for the regeneration of cathode material from spent lithium-ion batteries is provided. The method includes dissolving a lithium precursor in a polyhydric alcohol to form a solution. Degraded cathode material containing lithium metal oxides are dispersed into the solution under mechanical stirring, forming a mixture. The mixture is heat treated within a reactor vessel or microwave oven. During this heat treatment, lithium is intercalated into the degraded cathode material. The relithiated electrode material is collected by filtration, washing with solvents, and drying. The relithiated electrode material is then ground with a lithium precursor and thermally treated at a relatively low temperature for a predetermined time period to obtain regenerated cathode material.

16 Claims, 6 Drawing Sheets

(51) Int. Cl.
  *H01M 10/0525* (2010.01)
  *H01M 4/505* (2010.01)
  *H01M 4/525* (2010.01)

(52) U.S. Cl.
  CPC ............ *H01M 10/54* (2013.01); *H01M 4/505* (2013.01); *H01M 4/525* (2013.01); *Y02W 30/84* (2015.05)

(56) References Cited

U.S. PATENT DOCUMENTS

| | | | |
|---|---|---|---|
| 2004/0265216 A1 | 12/2004 | Nazri et al. | |
| 2014/0306162 A1 | 10/2014 | Poe et al. | |
| 2016/0043450 A1* | 2/2016 | Sloop | H01M 10/54 252/182.1 |
| 2016/0045841 A1* | 2/2016 | Kaplan | C01B 32/05 429/49 |
| 2017/0200989 A1 | 7/2017 | Sloop | |
| 2017/0324123 A1 | 11/2017 | Deb | |
| 2019/0273290 A1* | 9/2019 | Sloop | H01M 10/0525 |
| 2021/0226273 A1* | 7/2021 | Park | B01D 9/0054 |
| 2021/0317001 A1* | 10/2021 | Hekselman | C22B 13/045 |
| 2022/0149450 A1* | 5/2022 | Smith | H01M 4/0438 |
| 2022/0199966 A1* | 6/2022 | Chen | H01M 4/1391 |
| 2023/0014961 A1* | 1/2023 | Chen | H01M 10/54 |

OTHER PUBLICATIONS

Shi, Y. et al., "Effective regeneration of LiCoO2 from spent lithium-ion batteries: a direct approach towards high-performance active particles", Green Chemistry, 2018, 20, 851-862.

Shi, Y. et al., "Ambient-Pressure Relithiation of Degraded Lix Nio.5 CoO2Mn0.3O2 (o<x<1) via Eutectic Solutions for Direct Regeneration of Lithium-Ion Battery Cathodes", Adv. Energy Materials, 2019, 1900454, pp. 1-9.

* cited by examiner

| Sample | Peak splitting | TGA @800 | ICP Li |
|---|---|---|---|
| Pristine | 0.77 | 99.74% | 1.087 |
| DeLi | 1.01 | 97.85% | 0.973 |
| ReLi | 0.77 | 99.67% | 1.070 |

| Sample | 1st charge (mAh/g) | 1st discharge (mAh/g) | Coulombic efficiency | 4th charge (mAh/g) | 4th discharge (mAh/g) | Coulombic efficiency |
|---|---|---|---|---|---|---|
| Pristine | 163.7 | 144.6 | 88.3% | 146.2 | 145.6 | 99.6% |
| Delithiated | 140.5 | 129.3 | 92.0% | 131.7 | 131.0 | 99.5% |
| Relithiated | 163.2 | 145.8 | 89.3% | 146.9 | 146.2 | 99.5% |

RELITHIATION PROCESS FOR DIRECT REGENERATION OF CATHODE MATERIALS FROM SPENT LITHIUM-ION BATTERIES

CROSS-REFERENCE TO RELATED APPLICATIONS

This application claims the benefit of U.S. Provisional Application 63/174,082, filed Apr. 13, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to the direct recycling of lithium-ion battery cathodes.

BACKGROUND OF THE INVENTION

Developing new technologies for recycling lithium-ion batteries is an urgent task because of their widespread use in electronics and electric vehicles. Direct recycling offers greater advantages as a recycling strategy when compared with pyrometallurgy and hydrometallurgy routes and minimizes energy use and waste by eliminating mining and processing steps. One of the biggest challenges for direct recycling is how to regenerate the spent cathode in a more energy-efficient and economic manner with less impact on the environment, as the majority of the battery value is embedded in the cathode materials. The loss of lithium in the cathode materials is commonly believed to be responsible for the capacity degradation. Relithiation processes are thus required to recover the electrochemical properties of the degraded cathodes. However, the state-of-art regeneration processes are either energetically expensive and time-consuming or require expensive reaction set-up with safety issues. Therefore, it is desirable to develop an energy-efficient, scalable, cost-effective, and sustainable relithiation process to regenerate a range of cathode materials from spent lithium-ion batteries.

SUMMARY OF THE INVENTION

An improved method for the regeneration of cathode material from spent lithium-ion batteries is provided. In one embodiment, the method includes dissolving a lithium precursor in a polyhydric alcohol to form a solution. Degraded cathode material containing lithium metal oxides are dispersed into the solution under mechanical stirring, forming a mixture. The mixture is heat treated within a reactor vessel or microwave oven. During this heat treatment, lithium is intercalated into the degraded cathode material. The relithiated electrode material is collected by filtration, washed with solvents, and dried. The relithiated electrode material is then ground with a lithium precursor and thermally treated for a predetermined time period to obtain regenerated cathode material.

In this and other embodiments, polyhydric alcohol acts as both the fluxing medium and a reducing agent. The method more specifically includes, as a first step, the polyol treatment of degraded cathode materials, and as a second step, thermal treatment of relithiated cathode materials. Specifically, lithium precursors such as LiOH, LiCl, and LiBr are first dissolved into one or more polyhydric alcohols, such as ethylene glycol and tetraethylene glycol, to form solution A. Spent cathode of lithium metal oxides (e.g., $LiCoO_2$, NCA, NMC111, NCM622, $LiMn_2O_4$) or lithium metal phosphates (e.g., $LiFePO_4$) are dispersed in solution A under mechanical stirring, which is denoted as mixture B. Mixture B is heated to a relatively low temperature (e.g., 150° C.) while at atmospheric pressure and kept at that temperature within a reactor vessel. This heat treatment step can alternatively be realized by a microwave oven. During this heat treatment, the lithium will be intercalated into the degraded cathode materials to compensate the lithium loss. After the polyol process, the recovered electrode materials are collected by filtration, washing with solvents, and drying, which is denoted as solid C. The second step includes the thermal treatment of the solid C. In this step, the recovered materials are ground with lithium precursors (e.g., LiOH, $Li_2Co_3$) and thermally treated at another temperature (e.g., 500° C.) to obtain regenerated cathode materials.

The present invention therefore provides direct regeneration of positive electrode materials, which can be reused for battery manufacturing, thereby reducing costs and environmental burdens. The present invention also provides significant advantages over existing technologies. First, the polyol relithiation process is performed at atmospheric pressure and at low temperatures. The polyol family provides a wide operating temperature range of room temperature to about 350° C. for different cathode chemistries. This low temperature treatment is a benign process with negligible morphology perturbation. Second, the polyol solvents serve as both the fluxing medium and reducing agent. No other reducing agent is required for this process. Third, polyhydric alcohols are inexpensive and can be collected and reused. Both the scaling up of the polyol process and the separation of products from the polyol solvents are readily realized.

These and other features of the invention will be more fully understood and appreciated by reference to the description of the embodiments and the drawings.

DETAILED DESCRIPTION OF THE CURRENT EMBODIMENT

As discussed herein, the current embodiment generally relates to a method for the regeneration of cathode material from spent lithium-ion batteries. The method generally includes the polyol treatment of degraded cathode material followed by the thermal treatment of relithiated cathode material. Each operation is discussed below.

The polyol treatment of degraded cathode materials generally includes suspending a lithium precursor in a polyol solvent and subsequently heating the solution to a certain temperature. More specifically, one or more lithium precursors are dissolved in a polyhydric alcohol to form a solution, denoted as Solution A in FIG. 1. The lithium precursors can include, by non-limiting example, lithium hydroxide (LiOH), lithium acetate ($C_2H_3LiO_2$), lithium nitrate ($LiNO_3$), lithium chloride (LiCl), or lithium bromide (LiBr). The polyhydric alcohol can include, by non-limiting example, ethylene glycol, diethylene glycol, or tetraethylene glycol. Degraded cathode materials from partially or fully degraded lithium-ion batteries are dispersed in Solution A under mechanical stirring, which is denoted as Mixture B in FIG. 1. The degraded cathode materials can include lithium metal oxides (e.g., $LiCoO_2$, NCA, NMC111, NCM622, $LiMn_2O_4$) or lithium metal phosphates (e.g., $LiFePO_4$). Mixture B is heated to a first temperature (e.g., 150° C.) and kept at that temperature within a reactor vessel while at atmospheric pressure. This heat treatment step can alternatively be realized by a microwave oven. During this heat treatment, lithium precursors are intercalated into the degraded cathode materials to compensate for lithium losses. The intercalated electrode materials are then collected by filtration, washed with solvents, and dried, yielding solids which are denoted as Solid C.

Figure 1:
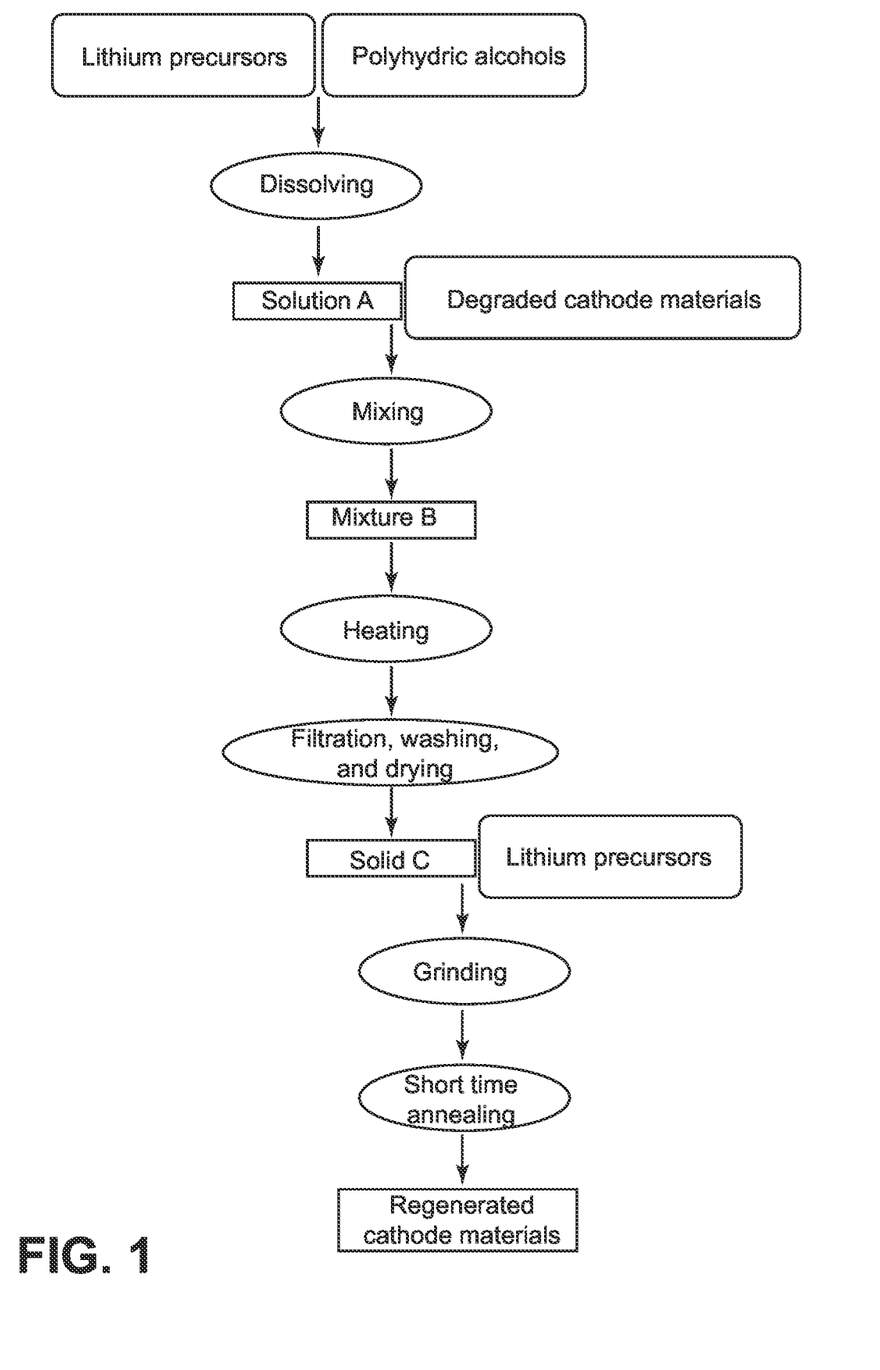
FIG. 1 is a flow chart illustrating a method for the regeneration of cathode material from spent lithium-ion batteries.

The dried, relithiated cathode materials (Solid C) are then mechanically ground to a fine powder, intermixed with one or more lithium precursors, and thermally treated at a second temperature, greater than the first temperature, for a predetermined time period to obtain regenerated cathode material. As shown in FIG. 1, the lithium precursors can include, by non-limiting example, lithium oxide ($Li_2O$), lithium hydroxide (LiOH), lithium carbonate ($Li_2CO_3$), or lithium bicarbonate ($LiHCO_3$). The thermal treatment of Solid C can occur at about 500° C. with a shortened annealing time. The resultant cathode materials can be reused for new battery manufacturing. For example, the resultant cathode materials can be processed as a new cathode electrode and paired with an anode electrode for producing new lithium-ion cells. The cathode electrode can include the regenerated lithium and metal oxides, and the anode electrode can include a lithium intercalating material, for example graphite or amorphous carbon.

The method of the current embodiment includes several advantages over existing technologies. First, the polyol relithiation process is performed at atmospheric pressure and at low temperatures. The polyol family provides a wide operating temperature range of room temperature to about 350° C. for different cathode chemistries. This low temperature treatment is a benign process with negligible morphology perturbation. Second, the polyhydric alcohol serves as a solvent, reducing agent, and ligand, to prevent particle agglomeration. No other reducing agent is required for this process. Third, polyhydric alcohols are inexpensive, possess low-toxicity, and can be collected and reused.

Figure 2:
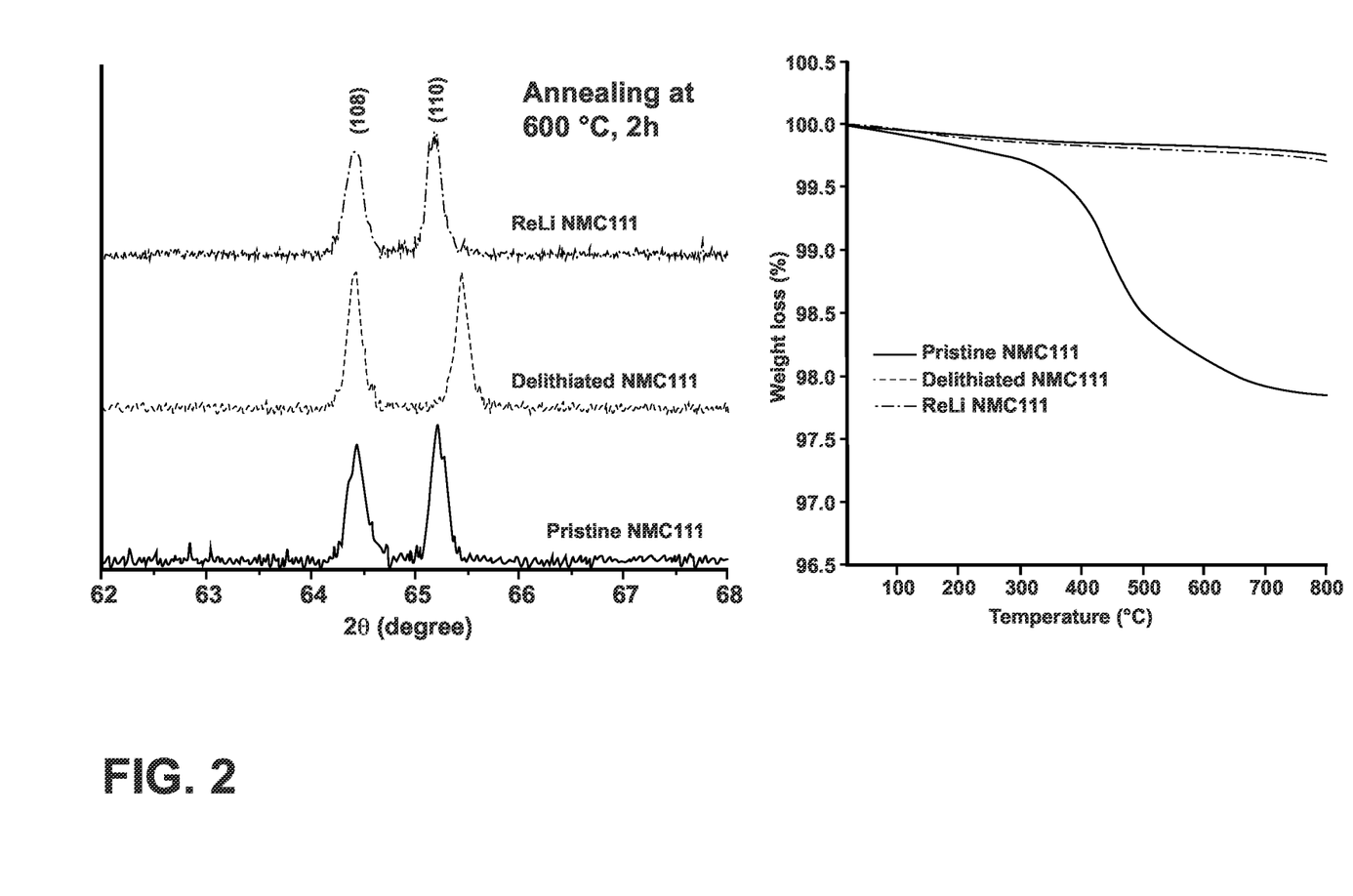
FIG. 2 includes graphs illustrating the X-ray diffraction (XRD) patterns and thermo-gravimetric analysis (TGA) curves of relithiated NMC 111 cathode materials relative to pristine and relithiated NMC 111.
Figure 3:
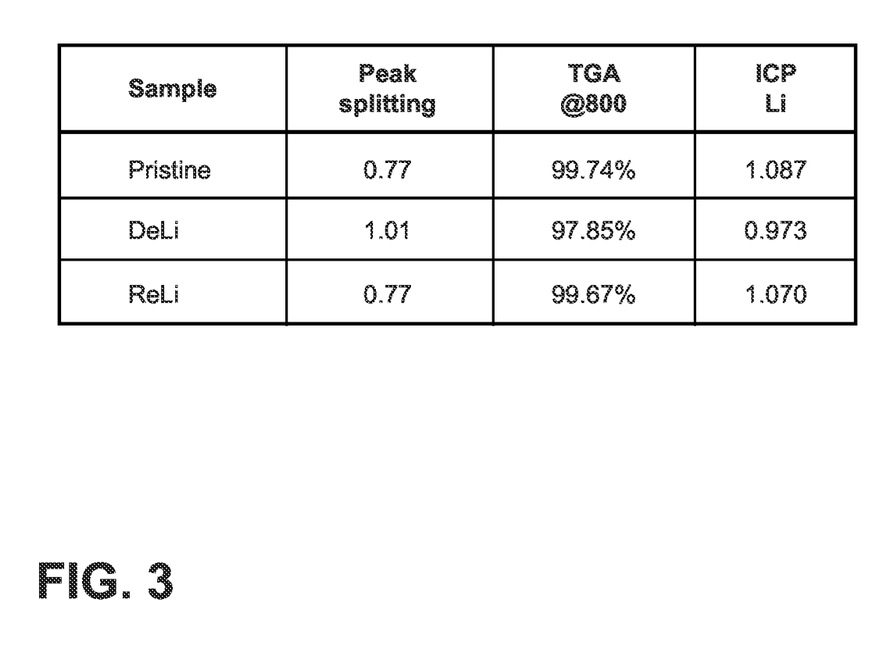
FIG. 3 is a table illustrating the XRD peak splitting, thermal stability from TGA, and compositional analysis of relithiated NMC 111 cathode materials relative to pristine and relithiated NMC 111.
Figure 4:
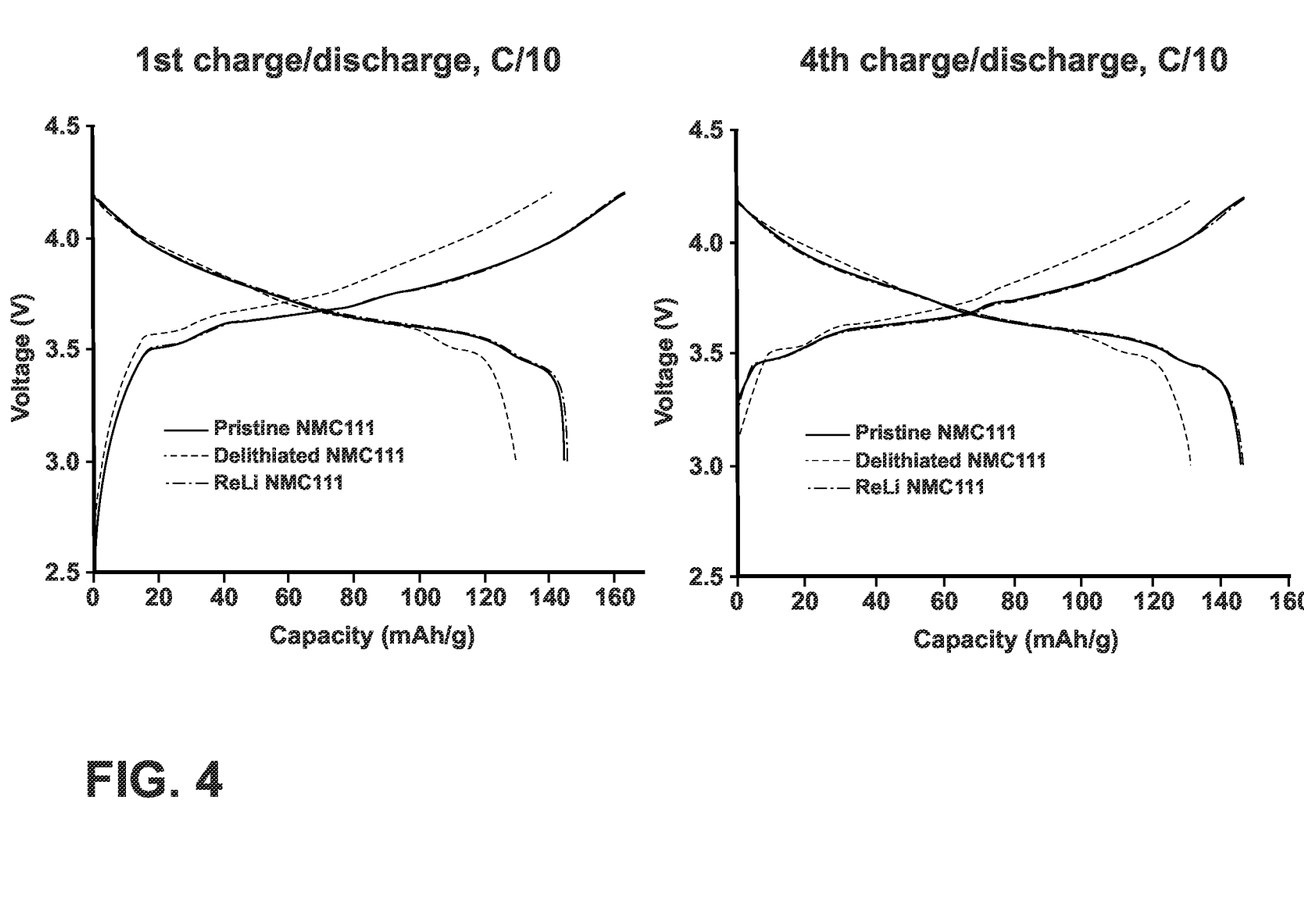
FIG. 4 includes graphs illustrating full cell electrochemical performance for relithiated NMC 111 cathode material using LiOH as a lithium precursor.
Figure 5:
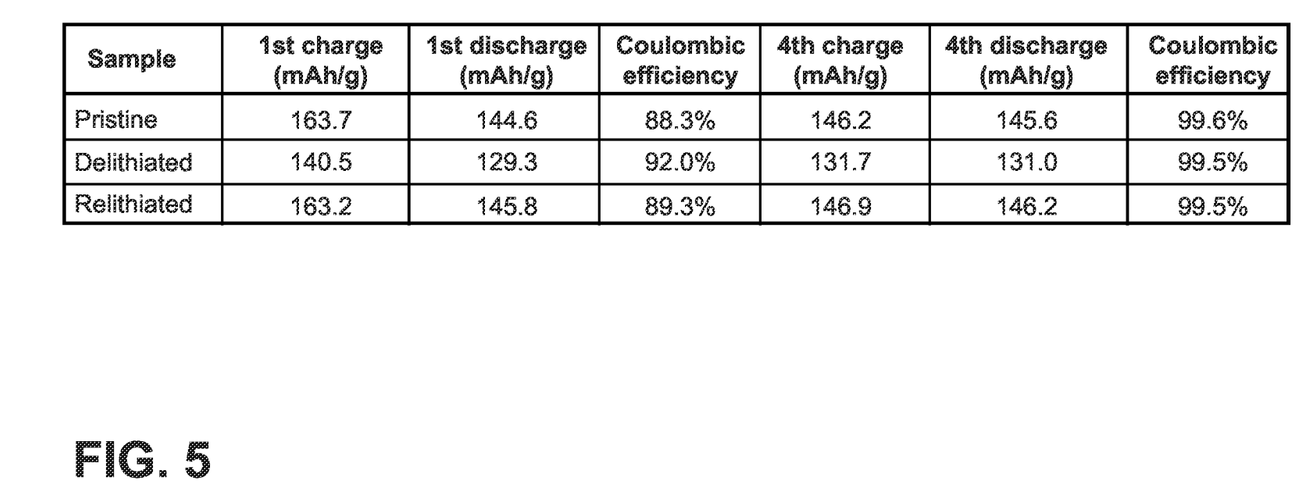
FIG. 5 is a table illustrating full cell electrochemical performance of relithiated NMC 111 cathode materials relative to pristine and relithiated NMC 111.
Figure 6:
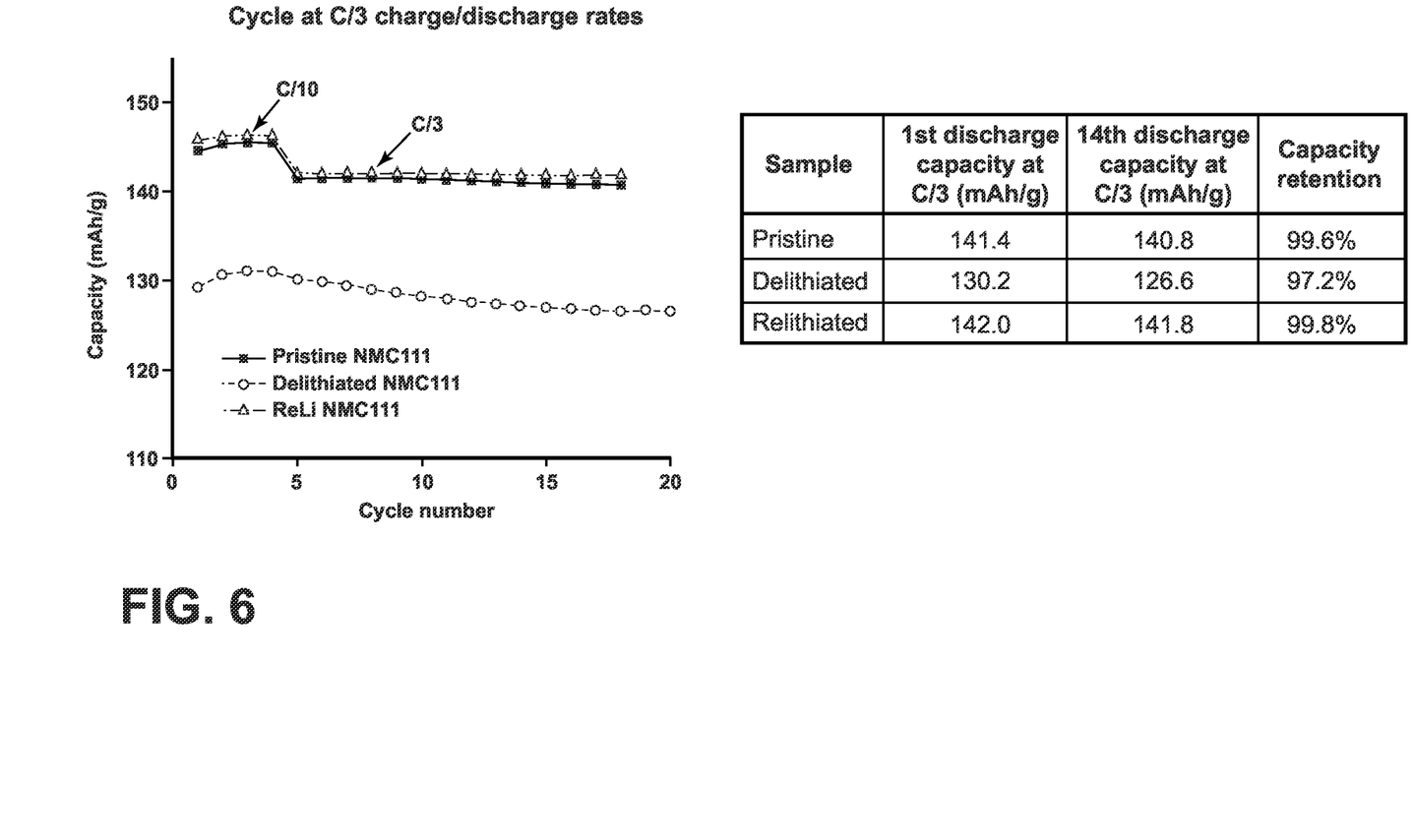
FIG. 6 includes a graph and a table illustrating cycle performance of relithiated NMC 111 cathode materials relative to pristine and relithiated NMC 111.

As shown in FIGS. 2 and 3 for example, the relithiation of NMC 111 cathode materials demonstrated a reduction in peak splitting between (108) and (110) after annealing at 600° C. for 2 hours, identical to that of pristine NMC 111. Thermal analysis (TGA) demonstrated enhanced thermal stability after relithiation, and a compositional analysis via inductively coupled plasma optical emission spectroscopy (ICP-OES) confirmed the restoring of lithium after polyol relithiation. As shown in FIGS. 4 and 5, the relithiated NMC 111 using LiOH as a lithium precursor demonstrated similar electrochemical performance to a pristine NMC 111 sample. Lastly, the relithiated NMC 111 demonstrated a very stable cycle performance, shown in FIG. 6, comparable to that of a pristine NMC 111 sample used in laboratory testing.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method comprising:
   dissolving a first lithium precursor within a polyhydric alcohol to form a first solution;
   combining a degraded cathode material with the first solution to form a first mixture comprising lithium ions;
   heat treating the first mixture at a first temperature that is greater than room temperature and less than 200° C. to relithiate the cathode material, wherein heat treating of the first mixture is performed at atmospheric pressure, such that the lithium ions are intercalated into the degraded cathode material, producing a relithiated cathode material;
   filtering and drying the relithiated cathode material from the first mixture to recover the relithiated cathode material;
   combining the relithiated cathode material with a second lithium precursor to form a second mixture; and
   annealing the relithiated cathode material by thermally treating the second mixture at a second temperature to produce a regenerated cathode material.

2. The method of claim 1 wherein the first lithium precursor includes lithium hydroxide, lithium chloride, lithium acetate, lithium nitrate, or lithium bromide.

3. The method of claim 1 wherein the polyhydric alcohol comprises a glycol.

4. The method of claim 1 wherein the degraded cathode material includes lithium metal oxides or lithium metal phosphates.

5. The method of claim 1 wherein the second lithium precursor includes lithium oxide, lithium hydroxide, lithium carbonate, or lithium bicarbonate.

6. The method of claim 1 wherein heat treating the first mixture includes heating the first mixture within a reactor vessel.

7. The method of claim 1 wherein heat treating the first mixture includes heat treating the first mixture within a microwave oven.

8. The method of claim 1 wherein combining the relithiated cathode material with a second lithium precursor includes grinding the relithiated cathode material into a powder.

9. The method of claim 1 wherein thermally treating the second mixture includes annealing the second mixture to the second temperature of at least 500° C.

10. The method of claim 1 wherein heat treating the first mixture includes heating the first mixture to the first temperature, and wherein thermally treating the second mixture includes heating the second mixture to the second temperature, the second temperature being greater than the first temperature.

11. The method of claim 1 wherein the filtered and dried relithiated cathode material comprises a solid.

12. A method comprising:
intermixing partially or fully degraded cathode material in a solution including a first lithium precursor and a polyhydric alcohol to form a first mixture;
heat treating the first mixture at a temperature greater than room temperature and less than 200° C. to relithiate the cathode material, wherein heat treating of the first mixture is performed at atmospheric pressure, such that the lithium ions are intercalated into the partially or fully degraded cathode material, producing a relithiated cathode material;
combining the relithiated cathode material with a second lithium precursor to form a second mixture and mechanically grinding the second mixture into a powder; and
annealing the powder to at least 500° C. to produce a regenerated cathode material for a cathode of a lithium-ion battery.

13. The method of claim 12 wherein the first lithium precursor includes lithium hydroxide, lithium chloride, lithium acetate, lithium nitrate, or lithium bromide.

14. The method of claim 12 wherein the second lithium precursor includes lithium oxide, lithium hydroxide, lithium carbonate, or lithium bicarbonate.

15. The method of claim 12 wherein the polyhydric alcohol comprises a glycol.

16. The method of claim 12 wherein the partially or fully degraded cathode material includes lithium metal oxides or lithium metal phosphates.

* * * * *